April 21, 1959 S. K. ALTES 2,883,450

COLOR TELEVISION DECODER

Filed Feb. 18, 1954 5 Sheets-Sheet 1

Inventor:
Stephen K. Altes,
by Charles M. Hutchins
His Attorney.

Inventor:
Stephen K. Altes,
by Charles M. Hutchins
His Attorney.

April 21, 1959 S. K. ALTES 2,883,450

COLOR TELEVISION DECODER

Filed Feb. 18, 1954 5 Sheets-Sheet 3

Inventor:
Stephen K. Altes,
by Charles M. Hutchins
His Attorney.

Inventor:
Stephen K. Altes,
by Charles M. Hutchins
His Attorney.

Inventor:
Stephen K. Altes,
by Charles M. Hutchins
His Attorney.

United States Patent Office 2,883,450
Patented Apr. 21, 1959

2,883,450

COLOR TELEVISION DECODER

Stephen K. Altes, Syracuse, N.Y., assignor to General Electric Company, a corporation of New York Application February 18, 1954, Serial No. 411,186

12 Claims. (Cl. 178—5.4)

This invention relates to electrical apparatus and, more specifically, to electronic circuits for incorporation in color television receivers. It has particular application to color television receivers in which the picture tube is of the single-electron-gun type.

The type of color television signal which up to the present time has found the most favor in the industry is a signal composed of three components. The first of these components, which occupies the lower part of the frequency band assigned to color television transmission, is the luminance component, which is expressive only of the brightness, but not the color, of the element of scene being scanned at the time. The other two components are the so-called chrominance components, which are respectively impressed on two subcarrier waves of equal frequency but of ninety-degree phase displacement with respect to each other. These chrominance components carry the color information and occupy the upper part of the frequency band assigned to color television transmission. They may be transmitted in a suppressed-subcarrier fashion. In order to make economical use of the available frequency spectrum, provision has been made for the luminance and chrominance components to overlap each other slightly in the spectrum, a fact which renders detection of the signals slightly more difficult than it would otherwise be. However, since the detection problem can be solved, it is generally felt that the resulting economy in use of the available spectrum justifies the inconvenience caused by frequency overlap. This is particularly true since a certain bandwidth of the available transmitting frequency spectrum must be granted to each transmitting station, and it is highly desirable that the width of such channel for color transmission be the same as the width of the earlier assigned channels for monochrome transmission in order to permit compatibility of the color television signal with existing monochrome receivers.

It is apparent that the color television signal presently favored in the industry has been designed mainly with its transmission properties, rather than ease of detection and reproduction of picture, in mind. A further example of this general statement is the fact that, while the commonly-accepted color television signal is fairly well adapted for actuating a receiver equipped with a picture tube possessing one electron gun for each of the three primary colors (red, green, and blue), the signal must undergo some type of modification if it is to be utilized for actuating a receiver equipped with a picture tube possessing only one electron gun. Such a receiver has the advantage of greater economy in that the manufacturing thereof is easier and there is no problem of adjustment to obtain the exact registration of images from three different electron guns. My invention is concerned with the modification or conversion which the color television signal must undergo in order to become suitable for actuation of a color picture tube of the single-electron-gun type.

A color television signal of the type presently favored in the industry may be described by the following expression:

$$E_m = E_y + [M \cos \omega t + N \sin \omega t] \quad \text{(Eq. 1)}$$

where: $E_m$ is the total composite video voltage applied to the modulator of the picture transmitter when a particular element of the scene is scanned; $E_y$ is the voltage representative of the luminance or brilliance (but not the color) of the particular element of scene scanned; M and N are voltages characteristic of certain linear combinations of voltages representing three primary color components of the color of the element of scene being scanned; $\omega$ is the angular frequency of the subcarrier waves upon which the color information is impressed; and $t$ represents the time at which the value of $E_m$ is desired.

According to the presently favored standards, the frequency of the subcarrier waves is 3.58 megacycles per second, and $\omega$ is $2\pi \times 3.58 \times 10^6$ radians per second. Also, according to the presently-favored standards, $E_y$, M, and N may be respectively represented in terms of three primary color components of the scanned element of scene, as follows:

$$\left.\begin{aligned} E_y &= .30E_R + .59E_G + .11E_B \\ 1.14M &= -.17E_R - .33E_G + .50E_B \\ 1.14N &= .70E_R - .59E_G - .11E_B \end{aligned}\right\} \quad \text{(Eq. 2)}$$

where: $E_y$, M, and N are as defined above; $E_R$ is a voltage representing the red primary color component of the element of scene scanned; $E_G$ is a voltage representing the green primary color component of the element of scene scanned; and $E_B$ is a voltage representing the blue primary color component of the element of scene scanned. It will be noted that, if $E_R$, $E_G$, and $E_B$ are all equal, $E_y$ will be equal to $E_R$, $E_G$, or $E_B$, and both M and N will be zero. Further, it will be noted that, in this treatment of the subject, the so-called "gamma" correction for picture-tube non-linearity is not being considered.

A signal of the type set forth in Equation 1 can be separated into its components by a process of subtraction and synchronous detection, which will produce color signals suitable for application to a color tube having an electron gun for each primary color. However, in order to make a signal of the type set forth in Equation 1 useful for actuating a color tube of the single-electron-gun type, some transformation must be made which will make available to the color tube a signal representative of the three color components in sequence. That is, the signal $E_m$, which may in some respects be regarded as a simultaneous signal, must be transformed into a signal which is definitely sequential in nature. Moreover, it is desirable that the sequential signal applied to the single-electron-gun color tube be capable of detection by symmetrical sampling in order that the third harmonic of the subcarrier frequency may be used as the sampling wave. These conditions will be satisfied if the signal applied to the single-electron-gun color tube can be put in the form defined by an expression of this type:

$$\left.\begin{aligned} E_N = &\tfrac{1}{3}E_R + \tfrac{1}{3}E_G + \tfrac{1}{3}E_B \\ &+ (\tfrac{1}{3}E_R - \tfrac{2}{3}E_G + \tfrac{1}{3}E_B) \sin (\omega t + \theta) \\ &+ \frac{1}{\sqrt{3}}(E_R - E_B) \cos (\omega t + \theta) \end{aligned}\right\} \quad \text{(Eq. 3)}$$

in which: $E_R$, $E_G$ and $E_B$ are as previously defined; and $\theta$ is a phase angle relating the components of the desired signal $E_N$ to one of the subcarrier waves.

The color television signal of the presently favored type, as described by Equation 1, may alternatively be described by the following equation, in which the expressions of Equation 2 have been substituted into Equation 1:

$$E_m=E_y+\frac{1}{1.14}\left[\frac{1}{1.78}(E_B-E_y)\sin\omega t+(E_R-E_y)\cos\omega t\right] \quad \text{(Eq. 4)}$$

As stated above, $E_m$ is the form of the color television signal currently favored in the industry, and represents the form of a signal which would appear at the output of the video detector of a color television receiver. The problem to be solved is to convert the signal as defined by Equations 1, 2, and 4 into a signal representable by an equation of the general form of Equation 3, thereby producing a signal which may be symmetrically sampled with accuracy.

Accordingly, an object of my invention is to provide an apparatus capable of converting a color television signal of the commonly accepted type into a signal which may be accurately sampled at equal time intervals.

A further object of my invention is to provide an apparatus capable of converting a color television signal of the commonly accepted type into a signal which is definitely sequential in nature.

A more general object of my invention is to provide an apparatus capable of converting any signal which has certain sequential properties expressed by trigonometric functions into a signal which is definitely sequential in nature, whether for color television or for some other purpose.

A specific object of my invention is to provide an apparatus capable of converting a color television signal of the commonly accepted type into a signal suitable for application to a color-television picture tube of the single-electron-gun type.

Briefly, the apparatus which I have invented separates the detected color television signal into its luminance and chrominance portions, multiplies part of the chrominance portion by a properly phased wave of sub-carrier frequency, multiplies the remainder of the chrominance portion by a properly phased wave of twice the sub-carrier frequency, combines these two modified parts of the chrominance portion and adds thereto a filtered version of the luminance signal, the final result being a signal capable of symmetrical sampling.

For additional objects and advantages, and for a better understanding of the invention, attention is now directed to the following description and the accompanying drawings. The features of the invention which are believed to be novel are pointed out with particularity in the appended claims.

In the drawings:

Fig. 2 shows also a phase shifter and a band-pass filter which may be used in conjunction with said multiplier in the circuits of my invention;

Fig. 3 shows also a phase shifter which may be used in conjunction with said demodulator in the circuits of my invention;

Figure 1:
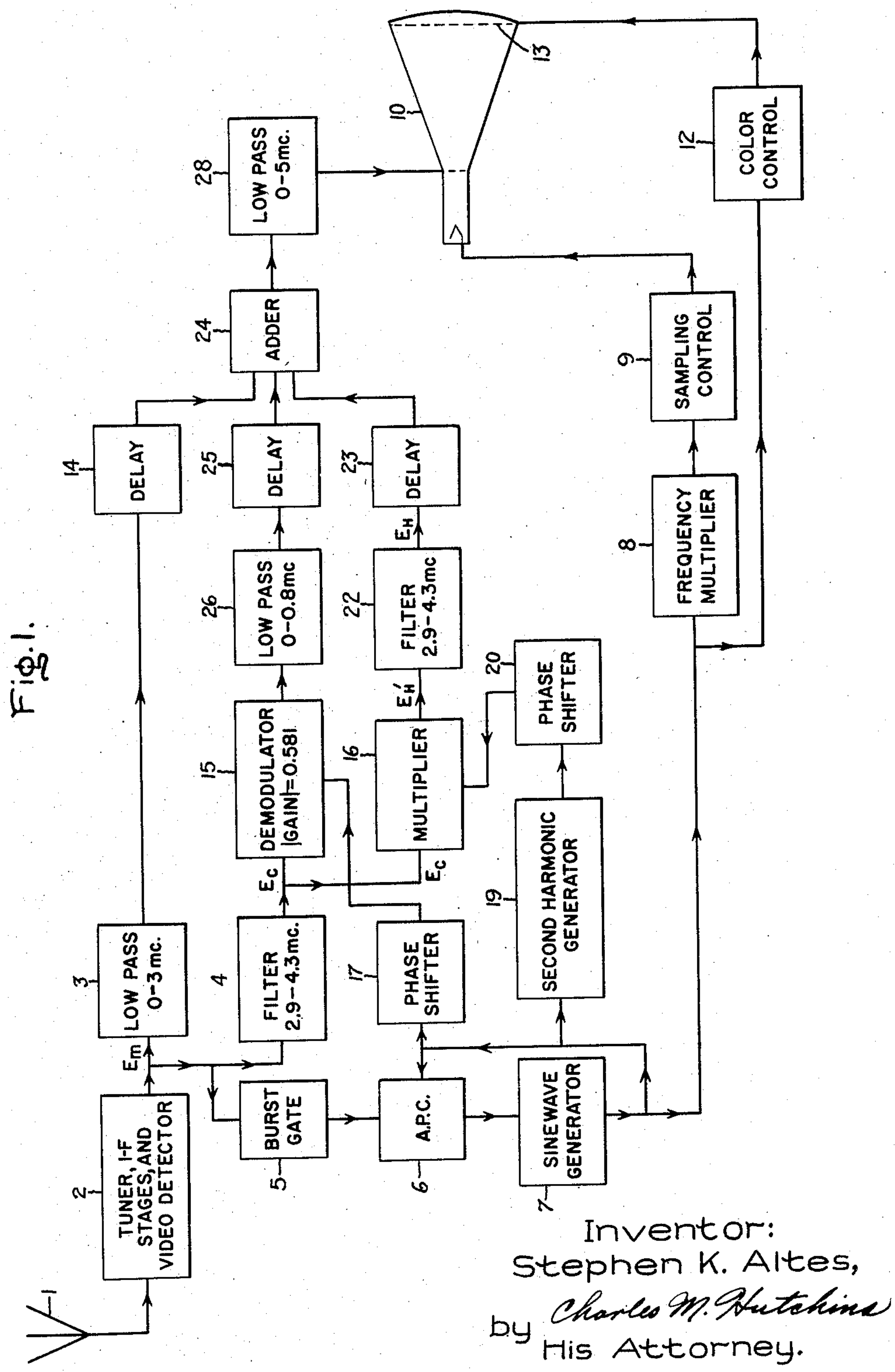
Fig. 1 is a schematic circuit diagram of a color television receiver embodying the signal-transformation circuits of my invention.

Referring again to Equation 3, it will be noted that, when the independent variable $(\omega t+\theta)$ takes on the values assigned in the table below, the signal $E_N$ represents respectively the three primary colors, unmixed with signals representing other colors. It will further be noted that the three values of $(\omega t+\theta)$ for which $E_N$ represents the respective primary colors are spaced 120 degrees apart and, hence, form a symmetrical system. This fact shows that a signal of the type represented by Equation 3 will be suitable for symmetrical sampling.

For $(\omega t+\theta)=30°$ $E_N=E_R$

For $(\omega t+\theta)=150°$ $E_N=E_B$

For $(\omega t+\theta)=270°$ $E_N=E_G$

Turning again to Equation 4, the portion of $E_m$ which carries the color information may be separated from the luminance component and designated as $E_c$, as follows:

$$E_c=\frac{1}{1.14}\left[\frac{1}{1.78}(E_B-E_y)\sin\omega t+(E_R-E_y)\cos\omega t\right] \quad \text{(Eq. 5)}$$

We may likewise define as $E_H$ the high-frequency portion of the signal expressed by Equation 3, being again the portion which carries the color information, as follows:

$$E_H=\left(\frac{1}{3}E_R-\frac{2}{3}E_G+\frac{1}{3}E_B\right)\sin(\omega t+\theta)+\frac{1}{\sqrt{3}}(E_R-E_B)\cos(\omega t+\theta) \quad \text{(Eq. 6)}$$

Thus, the apparatus of my invention must be capable of converting a signal as defined by Equation 5 into a signal as defined by Equation 6, i. e. $E_c$ into $E_H$.

Comparing Equations 1 and 4, it will be seen that:

$$M=\frac{1}{1.14}(E_R-E_y)$$

$$N=\frac{1}{1.14}\times\frac{1}{1.78}(E_B-E_y)$$

and that:

$$E_c=M\cos\omega t+N\sin\omega t$$

These mathematical statements of Equations 1 through 6 constitute the background required in order to understand how the apparatus of my invention makes the transformation of $E_c$ into $E_H$.

The apparatus shown in the several figures will now be discussed in detail. Components which appear in the same fashion in all figures of the drawings have been assigned reference numerals which are the same throughout, while components which are not respectively the same in all figures or appear in different relative circuit arrangements in different figures have been assigned different reference numerals in the several figures. Components whose circuits may be entirely well-known and conventional are shown only in simplified block form in order to simplify the drawings.

In Figures 1, 4, 5, and 6, the transmitted wave, including both video and audio information, is conventionally received by an antenna 1, from which the signal goes to a tuner, intermediate-frequency stages, and a video detector (all represented by the block 2). The output of the video detector is the composite color signal $E_m$ as defined by Equations 1 and 2 above.

In the receiver of Figure 1, the composite color signal goes to a low-pass filter 3, a band-pass filter 4, and a burst gate circuit 5. Low-pass filter 3 passes the luminance component $E_y$ but rejects most of the chrominance component $E_c$ of the composite signal. On the other hand, band-pass filter 4 passes most of the chrominance component $E_c$ of the composite signal, but rejects most of the luminance component. Since the frequency spectra of $E_y$ and $E_c$ overlap each other, a simple filter is not capable of accomplishing perfect separation thereof, but adequate performance may be obtained respectively with a low-pass filter passing frequencies below about three megacycles per second and a band-pass filter passing frequencies between about 2.9 and 4.3 megacycles per second. Burst gate circuit 5 derives from the composite signal $E_m$ a phase and frequency reference on the basis of which an automatic phase control circuit 6 and a sinewave generator 7 reproduce the chrominance subcarrier wave $\omega$ as defined above.

The subcarrier wave $\omega$ is supplied to a frequency multiplier 8 which produces a sampling wave to be employed by a sampling control circuit 9 in actuating a cathode ray tube 10 at the desired instants. Frequency multiplier 8 may be such as to triple the frequency $\omega$ fed to it, in which case the third harmonic generated by frequency multiplier 8 may be used as the sampling wave which establishes the times for the signal to be delivered to the cathode ray tube. Thus, the sampling wave can easily be obtained in the receiver by tripling the frequency $\omega$, which can in turn be obtained from the "color burst," or waveform of frequency $\omega$ which is commonly transmitted between every two lines of color television picture signal at the image is scanned, line by line. It will be understood that the detailed means for the derivation of the sampling wave is outside the scope of my invention, which pertains to the apparatus for putting the color television signal in condition for sampling.

The regenerated subcarrier goes not only to frequency multiplier 8, but also to a color-control circuit 12, which energizes a color-control electrode 13 that directs the cathode-ray-tube beam to the proper phosphors on the screen of the tube at the proper times. That is, the electron beam of the cathode ray tube must at all times be so directed that it strikes a screen phosphor which will glow in a color corresponding to the sequential color signal which is at that instant controlling the tube. Such a color-control device, represented by electrode 13, may comprise a variably charged mesh of deflecting grid wires so arranged as to deflect the electron beam to the proper phosphors on the face of the tube. Since the details of such color control mechanism are beyond the scope of my invention, any suitable known means may be employed, as long as said means is capable of directing the electron beam to the proper phosphor corresponding to the color represented by the tube-actuating signal at that instant.

It will be observed that cathode ray tube 10 is shown as having only a single electron gun. Although much work in the field of color television has been done with receiver picture tubes having an electron gun for each of the three primary colors (red, green, and blue), certain advantages reside in receiver picture tubes having only a single electron gun. Such advantages include the features of decreased manufacturing cost and absence of the problem inherent in obtaining the exact coincidence of the images from three electron guns. However, a picture tube with a single electron gun, or single-gun tube, must be actuated by a signal which is expressive of the three primary-color components of the image in sequence. In other words, since a single-gun tube can be controlled by only one signal voltage at a time, the three necessary primary-color signal voltages cannot be supplied to the tube simultaneously, but must be supplied sequentially. As has been pointed out above, because the commonly-accepted composite color television signal is to some extent a simultaneous signal, the problem of conversion to a sequential signal is the problem to which my invention is directed. This problem is successfully solved by the apparatus of my invention now to be described in detail. It will be seen that the transformation performed by the apparatus to be described includes not only the conversion of the signal of Equation 1 into a strictly sequential signal, but also the adjustment of the signal so that the three primary color components can be sampled symmetrically, or at equal time intervals.

Returning to the circuit of Figure 1, it has been pointed out that the previously described circuitry (elements 5 through 13) may be of any suitable known construction because the details thereof do not form part of my invention. Full discussion of representative embodiments for these elements will be found in the literature in a number of places, of which the following articles may be mentioned:

A single-gun color picture tube 10 and the color control and deflection mechanism 12 and 13 may correspond to the description appearing in Weimer and Rynn, "A 45-Degree Reflection-Type Color Kinescope," Proc. I.R.E., vol. 39, No. 10, October 1951, pages 1201–1211. A sampling control such as sampling control 9 appears in the same article at page 1207 and in Fig. 11 on page 1208. Further, a frequency multiplier which may be used at 8 appears in the same article on page 1209 and in Fig. 12.

Networks suitable for the burst-gate circuit 5, automatic phase control 6 and sinewave generator 7 are illustrated by way of example in Fink, "Synchronization in Color Television," Electronics, vol. 26, No. 5, May 1953, pages 170–175.

Further illustration of frequency multiplication techniques applicable to frequency multiplier 8 appears in Sterky, "Frequency Multiplication and Division," Proc. I.R.E., vol. 25, No. 9, September 1937, pages 1153–1173.

As described above, low-pass filter 3 in the embodiment of Figure 1 passes the luminance component $E_y$ while rejecting most of the chrominance component $E_c$ of the composite video signal $E_m$. Similarly, band-pass filter 4 passes most of the chrominance component $E_c$ while rejecting most of the luminance component $E_y$. It will be understood that filter 4 may be a high-pass filter rather than a band-pass filter. The output of filter 3 goes to a delay-equalizing means 14, while the output of filter 4 goes to a demodulator 15 and a multiplier 16. Also supplied to demodulator 15 is a wave of frequency $\omega$ from a phase shifter 17 which in turn derives its input (of frequency $\omega$) from sinewave generator 7, or from any equivalent source of subcarrier frequency $\omega$. Multiplier 16 is supplied not only from filter 4, but also by a wave of twice subcarrier frequency from any suitable source, such as a second-harmonic generator 19 and a phase shifter 20. These components may, like phase shifter 17, draw their input from sinewave generator 7 or from any other suitable source of subcarrier frequency. The phases of the waves supplied by phase shifter 17 to demodulator 15 and by phase shifter 20 to multiplier 16 are critical and must be stated in terms of the parameters of demodulator 15 and multiplier 16 respectively.

Figure 2:
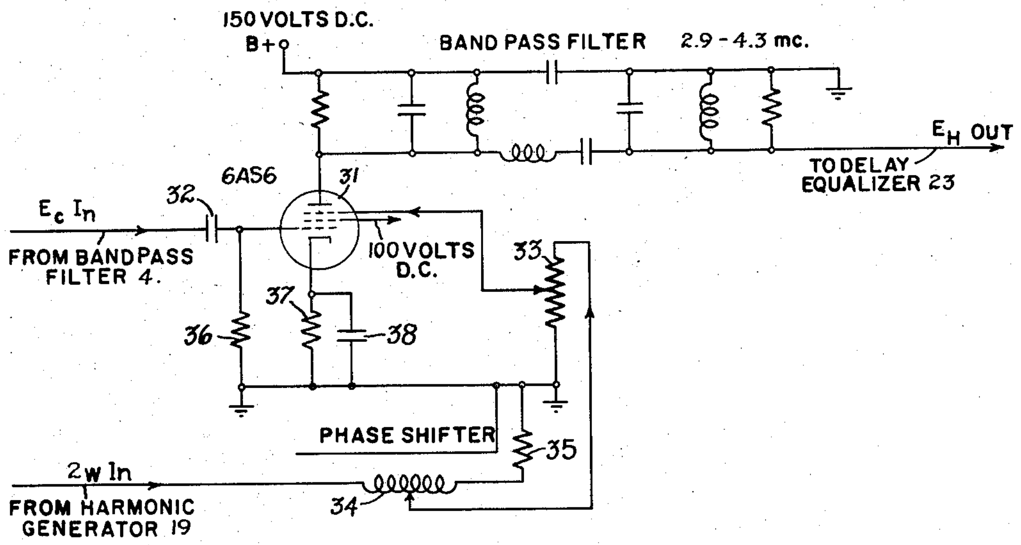
Fig. 2 is a detailed circuit diagram of a multiplier which forms an important part of my invention.

Since the operation of multiplier 16 is important to the system embodying my invention, let us next discuss the characteristics of the multiplier and its associated circuits. Figure 2 shows a suggested circuit for the multiplier, together with its input phase shifter 20, and with a band-pass filter 22 which may be employed in the output of multiplier 16. In Figure 2, the circuitry below the ground line represents phase shifter 20, while the circuitry above the ground line constitutes multiplier 16 itself and output band-pass filter 22.

It will be noted that multiplier tube 31, shown as a 6AS6 pentode in Figure 2, may be connected in such a way that the chrominance signal $E_c$ is impressed on the first grid thereof, while a wave of twice the subcarrier frequency and of appropriate phase is supplied to the third grid thereof. This application of two signals to the grids of tube 31 results in the required multiplication of the two signals. The effective gain of multiplier 16 may be defined by the following expression:

$$K=r(1+2m\cos 2\omega t+2n\sin 2\omega t) \qquad \text{(Eq. 7)}$$

where: K is the effective gain of the multiplier 16; $r$ is a relative gain factor of which the magnitude must be mathematically determined; $m$ and $n$ are likewise constant factors to be established mathematically; and $\omega$ and $t$ are as previously defined.

It will be recalled at this point that $E_H$ was defined in Equation 6 as the "high-frequency" portion of the desired transformed signal. Since the function of multiplier 16 and of filter 22 is to produce the signal $E_H$, the values of the constants $m$, $n$, and $r$ above must be such as to permit the conversion of $E_c$ into $E_H$ in multiplier 16 and filter 22. This requirement may be stated mathematically as follows:

$$E_H'=KE_c$$

and (Eq. 8)

$$E_H=E_H' \text{ less high-frequency terms}$$

where: K is as defined in Equation 7, and $E_H'$ is the signal delivered by multiplier 16 to filter 22.

Substitution of Equation 7 into Equation 8 and insertion of M and N as previously defined, followed by elimination of higher-frequency components filtered out by band-pass filter 22, gives the following expression for the output of filter 22:

$$E_H=r[M(1+m)+Nn]\cos\omega t + r[N(1-m)+Mn]\text{ sine }\omega t \qquad \text{(Eq. 9)}$$

It will be noted that double-frequency terms have been eliminated from Equation 9 by means of well-known trigonometric identities. Now, in order to put Equation 9 in a form which will be more easily recognizable as that of Equation 6, the reference phase may be changed by an angle $\theta$, and the following substitutions may be made:

$$x=r\sin\theta$$
$$y=r\cos\theta$$

We then have this expression for $E_H$, the output of filter 22, in which the constants are still to be evaluated:

$$E_H=\{[(1+m)y-nx]M+[ny-(1-m)x]N\}\cos(\omega t+\theta) + \{[(1+m)x+ny]M+[nx+(1-m)y]N\}\sin(\omega t+\theta) \qquad \text{(Eq. 10)}$$

From Equation 2 and the relationships $$M=\frac{1}{1.14}(E_R-E_y)$$

$$N=\frac{1}{1.14}\times\frac{1}{1.78}(E_B-E_y)$$

we find that the following relationships are true:

$$\frac{1}{3}E_R-\frac{2}{3}E_G+\frac{1}{3}E_B=0.7664M+0.9286N \qquad \text{(Eq.11)}$$

$$\frac{1}{\sqrt{1}}(E_R-E_B)=0.6582M-1.1715N \qquad \text{(Eq.12)}$$

It will be observed that the respective left sides of these equations are the coefficients of the two respective trigonometric terms in Equation 6, which defines $E_H$. Therefore, if multiplier 16 and filter 22 are to accomplish their mission of producing $E_H$, the respective coefficients of the trigonometric terms in Equation 6 must be equal to the respective right sides of Equations 11 and 12. When Equation 6 is put in the form of Equation 10, it will be noted further that the four individual bracketed coefficients of M and N must be identical with the respective numerical coefficients of M and N in Equations 11 and 12. Therefore, four simultaneous equations can be written, from which the following values may be found:

$$x=0.9690$$
$$y=0.7934$$
$$m=-0.1935$$
$$n=-0.0189$$
$$r=1.252$$
$$\sqrt{m^2+{}^2n}=0.1944$$
$$\tan\theta=1.220$$
$$\theta=50.7^\circ$$

Having the values above the value of K as defined in Equation 7 is thereby established, and elimination of the "sine" term in Equation 7 gives the following:

$$K=1.252\left[1-(2)\times(0.1944)\cos\left(2\omega t-\frac{5.6}{57.3}\right)\right] \qquad \text{(Eq. 13)}$$

where $$\frac{5.6}{57.3}$$

is the angle in radians necessary to eliminate the "sine" term from Equation 7. This angle, 5.6 degrees, is the angle whose tangent is $$\frac{n}{m}$$

Upon substitution in Equation 6 of the value, $\theta=50.7$ degrees, or $$\frac{50.7}{57.3}\text{ radians}$$

$E_H$ is found to be as follows:

$$E_H=\left(\frac{1}{3}E_R-\frac{2}{3}E_G+\frac{1}{3}E_B\right)\sin\left(\omega t+\frac{50.7}{57.3}\right) + \frac{1}{\sqrt{3}}(E_R-E_B)\cos\left(\omega t+\frac{50.7}{50.3}\right) \qquad \text{(Eq. 14)}$$

The foregoing equations mean in essence that, in order to transform $E_c$ into a signal which by mere stripping of high-frequency components will become $E_H$, multiplier 16 must have a gain substantially as given by the following equation:

$$K=1.25\left[1-.389\cos\left(2\omega t-\frac{5.6}{57.3}\right)\right] \qquad \text{(Eq. 15)}$$

That is, in the configuration shown by Figure 2, the peak of the second harmonic wave applied to the third grid of tube 31 should occur substantially 5.6 degrees (at second harmonic frequency) behind the peak of the $(E_R-E_y)$ subcarrier wave. This phase comparison is referred to the $(E_R-E_y)$ subcarrier wave rather than to the $(E_B-E_y)$ subcarrier wave because of the election to retain the "cosine" rather than the "sine" term in Equations 13 and 15. It will be noted that Equation 15 completely specifies the performance of multiplier 16. Although the multiplier has been described in terms of the circuit of Figure 2, any multiplier circuit configuration which satisfies Equation 15 may be employed. For instance, it may be found preferable to supply $E_c$ and the double-subcarrier-frequency wave to electrodes other than the first and third grids of a pentode respectively, or even perhaps not to use a pentode at all. However, for purposes of illustration, the circuits of Figure 2 have been briefly described, with the understanding that they are exemplary only and that any equivalent circuits which satisfy Equation 15 may be used.

In Figure 2, the signal $E_c$ is supplied to the control grid of tube 31 through a coupling capacitor 32, while the double-subcarrier-frequency wave is supplied to the suppressor grid of tube 31 from a potentiometer 33. The voltage applied across potentiometer 33 is shown as derived from a phase shifter consisting of a delay line 34 and a resistor 35 through which said delay line is connected to ground. The sheath of delay line 34 is likewise shown connected to ground. The input to delay line 34 is in turn shown as derived from a second-harmonic generator designated as block 19 in Figure 1. It will be obvious that the positions of the second-harmonic generator 19 and of the phase shifter 20 may be interchanged. It will be noted that the grid-leak resistor 36 and the cathode-circuit resistor 37 and capacitor 38 are completely conventional. Turning to the circuitry which receives the output of tube 31, as shown in Figure 2, the inductors and capacitors which appear in the plate circuit of tube 31 constitute a conventional band-pass filter, as represented by block 22 in Figure 1. This assembly may comprise any arrangement of components which will produce a passband extending substantially from 2.9 megacycles to 4.3 megacycles.

Returning to Figure 1, it will be noted that the output of band-pass filter 22 goes to a delay-equalizing means 23 which in turn feeds its output to an adder 24. The adder 24 receives not only the output of delay-equalizing means 23, but also the outputs of delay-equalizing means 14, which has been above described, and of a delay-equalizing means 25, which is yet to be described. It will be understood that the functions of delay-equalizing means 14, 23, and 25 are to insure that the time delays experienced by the signals passing through their respective parallel branches from tuner, I.-F. stages, and video detector 2 to adder 24 are all equalized. Thus, the delays imposed by blocks 14, 23, and 25 are all mutually dependent, and if the delay imposed by one of them be arbitrarily set, the delays imposed by the other two must thereby be established in such a way as to equalize the respective delays in the three parallel branches. It will be apparent that no delay-equalizing means need be employed in the one of the three parallel branches which has the largest inherent delay of the three. By omitting that unnecessary delay-equalizing means, the delays that must be imposed by the other two delay-equalizing means will be minimized. The above-mentioned delay-equalizing means may take any conventional form and might, for instance, comprise delay lines with grounded sheaths like the line 34 employed in phase shifter 20. Adder 24 may likewise be of any conventional type and might, for instance, comprise a potentiometer through which are fed the various signals to be added.

Returning to the circuit of Figure 1, it will be noted that there is one parallel branch which remains to be described in detail, namely the branch in which demodulator 15 appears. As has been stated, demodulator 15 draws the signal $E_c$ from filter 4 and, together with a low-pass filter 26, performs the essential function of producing therefrom a new "low-frequency" signal $E_L$ which is to be combined in adder 24 with the filtered and delayed signal $E_m$, and the delayed "high-frequency" signal $E_H$. The respective terms "low-frequency" and "high-frequency" are used merely to distinguish signals derived from the demodulator branch from signals derived from the multiplier branch. It will be observed that the actual difference in frequency between the "low-frequency" and "high-frequency" signals, as established by filters 26 and 22 respectively, is not very great.

It will be remembered that $E_N$ as defined in Equation 3 represents the signal which is the desired output of the circuitry of my invention. It will further be remembered that the trigonometric terms on the right-hand side of Equation 3 were taken together and denominated $E_H$. It is the signal $E_H$ which is produced by the circuit branch including multiplier 16 and filter 22. Now, it will be observed that the first three terms on the right-hand side of Equation 3 remain to be produced. These may be taken together and denominated $E_L$, as follows:

$$E_L = \tfrac{1}{3}E_R + \tfrac{1}{3}E_G + \tfrac{1}{3}E_B \qquad \text{(Eq. 16)}$$

It is thus the joint task of the demodulator branch and of the branch containing low-pass filter 3 to convert $E_c$, as defined by Equation 5, and $E_m$, as defined by Equation 4, into $E_L$.

In order to produce $E_L$, the signal $E_c$ is multiplied in demodulator 15 by a wave of subcarrier frequency $\omega$, and the product, after being stripped of high-frequency components in filter 26 and having delays equalized, is added in adder 24 to the luminance signal $E_y$ from filter 3 and delay-equalizing means 14. Stating these operations mathematically, there is the following definition for $E_L$:

$$E_L = pE_y + 2(f\cos\omega t + h\sin\omega t) \times \frac{1}{1.14}\left[\frac{1}{1.78}(E_B - E_y)\sin\omega t + (E_R - E_y)\cos\omega t\right]$$

minus components eliminated by filter 26 (Eq. 17)

where: $p$, $f$, and $h$ are gain constants yet to be established, and $2(f\cos\omega t + h\sin\omega t)$ represents the wave of subcarrier frequency by which $E_c$ is multiplied in demodulator 15.

Upon simplification of Equation 17 and elimination of the double-frequency terms which are cut off by low-pass filter 26, we have the following expression for $E_L$:

$$E_L = pE_y + \frac{1}{1.14} \times \frac{1}{1.78} h(E_B - E_y) + \frac{1}{1.14} f(E_R - E_y) \qquad \text{(Eq. 18)}$$

If $E_L$ as stated in Equation 18 is to be equal to $E_L$ as stated in Equation 16, the respective coefficients of the components $E_R$, $E_G$, and $E_B$ in the two equations must be the same. When Equation 2 is substituted into Equation 18, and the resulting expression is compared with Equation 16, it will be apparent that three simultaneous equations (one for each of the above-mentioned components) may be set up. From those three simultaneous equations, the following values may be found for the constants:

$$p = 1.0$$
$$f = 0.187$$
$$h = 0.550$$
$$\sqrt{f^2 + h^2} = 0.581$$
$$f/h = 0.339$$
$$\arctan 0.339 = 18.7°$$

Consideration of the values of these constants shows that the gain of the branch including low-pass filter 3 and delay-equalizing means 14 should be unity. In order to have such an over-all gain, it may be found desirable to include in that branch a suitable amplifier. The above-listed constants further show that the gain of demodulator 15 should have a magnitude of 0.581, where said gain may be defined as the ratio of the D.-C. output value to the zero-to-peak value of the A.-C. input signal $E_c$. Still another observation which may be drawn from the enumerated constants is that the wave supplied to demodulator 15 from phase shifter 17 should be so phased that it is substantially 18.7 degrees in advance of the $(E_B - E_y)$ subcarrier wave [or 71.3 degrees behind the $(E_R - E_y)$ subcarrier wave in demodulator 15].

Figure 3:
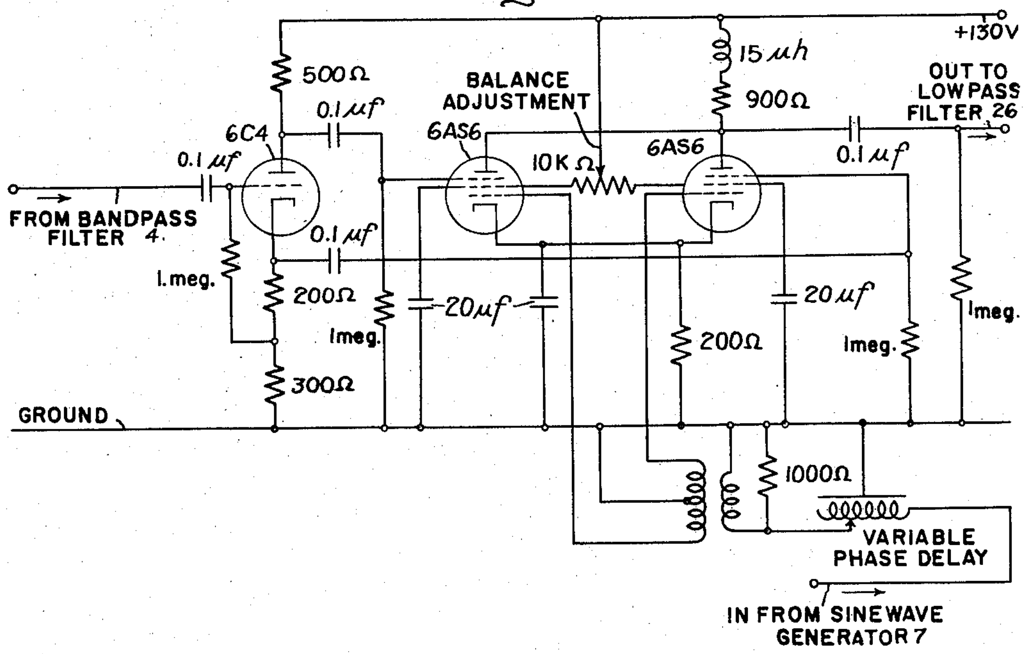
Fig. 3 is a detailed circuit diagram of a satisfactory design of demodulator to be incorporated into the circuitry of my invention.

A suggested circuit diagram for demodulator 15 and phase shifter 17 is shown in Figure 3, wherein the circuitry above the ground line represents demodulator 15, while the circuitry below the ground line represents phase shifter 17. It will be observed that the input tube of the demodulator is shown as a 6C4 triode and that the plate of the triode is capacitor-coupled to the suppressor grid of one of a pair of 6AS6 pentodes. It will further be observed that the cathode of the input triode supplies a signal through another capacitor to the suppressor grid of the second of the pair of 6AS6 pentodes. Since this latter connection from the triode cathode is in the form of a cathode follower, and since the plate and cathode circuits of the triode have substantially equal resistances, this is a so-called phase splitter type of connection. While the control grids of the pentodes receive in push-pull fashion the output of phase shifter 17, the screen grids of the two pentodes are connected to a balance potentiometer in such a way that the output taken from the plates of the pentodes will be zero when the input to the triode is zero. Thus, demodulator 15 is a "balanced demodulator." It will be obvious that the input tube might be a pentode instead of a triode and that various other modifications of the circuitry shown in Figure 3 may be made without departing from my invention. In fact, any electrical circuits which satisfy Equations 17 and 18, and which are characterized by the proper values of $f$ and $h$, may be employed. Phase shifter 17 has been shown as a center-tapped transformer fed by a delay line similar to the one employed in phase shifter 20. Once again any suitable known type of phase shifter may be employed.

Having specified a suitable circuit for demodulator 15, the remaining components in the demodulator branch should be briefly described. As shown in Figure 1, the output of demodulator 15 goes to a low-pass filter 26 wherein any components over approximately 0.8 megacycle are rejected. Filter 26 may be of any known low-pass filter construction. As aforementioned, the output of filter 26 goes to delay equalizer 25, in which suitable delay is imposed, in order to insure that the outputs of delay equalizers 14, 23, and 25 will be signals all of which have undergone equal delay while in transit from tuner, I.-F. stages and video detector 2. As previously stated, the outputs of delay equalizers 14, 23, and 25 are all combined in conventional adder 24, which in turn feeds its output to a low-pass filter 28. Filter 28 may be of any conventional construction and, by rejecting all frequency components above approximately five megacycles per second, eliminates all extraneous harmonics which may be present in the output of adder 24. If adder 24 is such as to have peaking-circuit characteristics, then adder 24 will itself be capable of eliminating the undesired harmonic components, in which case filter 28 will be unnecessary.

The output of filter 28 is $E_N$, the signal which the apparatus of my invention is intended to produce. This signal may be fed to the grid (or other electrode) of cathode ray tube 10, or may be utilized for any desired purpose whatever. As has been previously pointed out in this specification, the two circuit branches terminating in delay equalizers 14 and 25 have together produced $E_L$, while the circuit branch terminating in delay equalizer 23 has produced $E_H$. Since the sum of $E_L$ and $E_H$ is $E_N$, the output of adder 24 when stripped of extraneous harmonics by filter 28 has been shown to be the desired end product of my invention. This signal $E_N$ is the strictly sequential signal which is needed in order that symmetrical sampling may be employed without inaccuracy of reproduction.

Although I have described in detail the embodiment of Figure 1, it will be readily apparent that numerous modifications in circuit arrangement may be made without departing from the principles of my invention. One of these modifications is illustrated in Figure 4, wherein some simplification over the embodiment of Figure 1 has been achieved through the use of a step filter or step amplifier.

Figure 4:
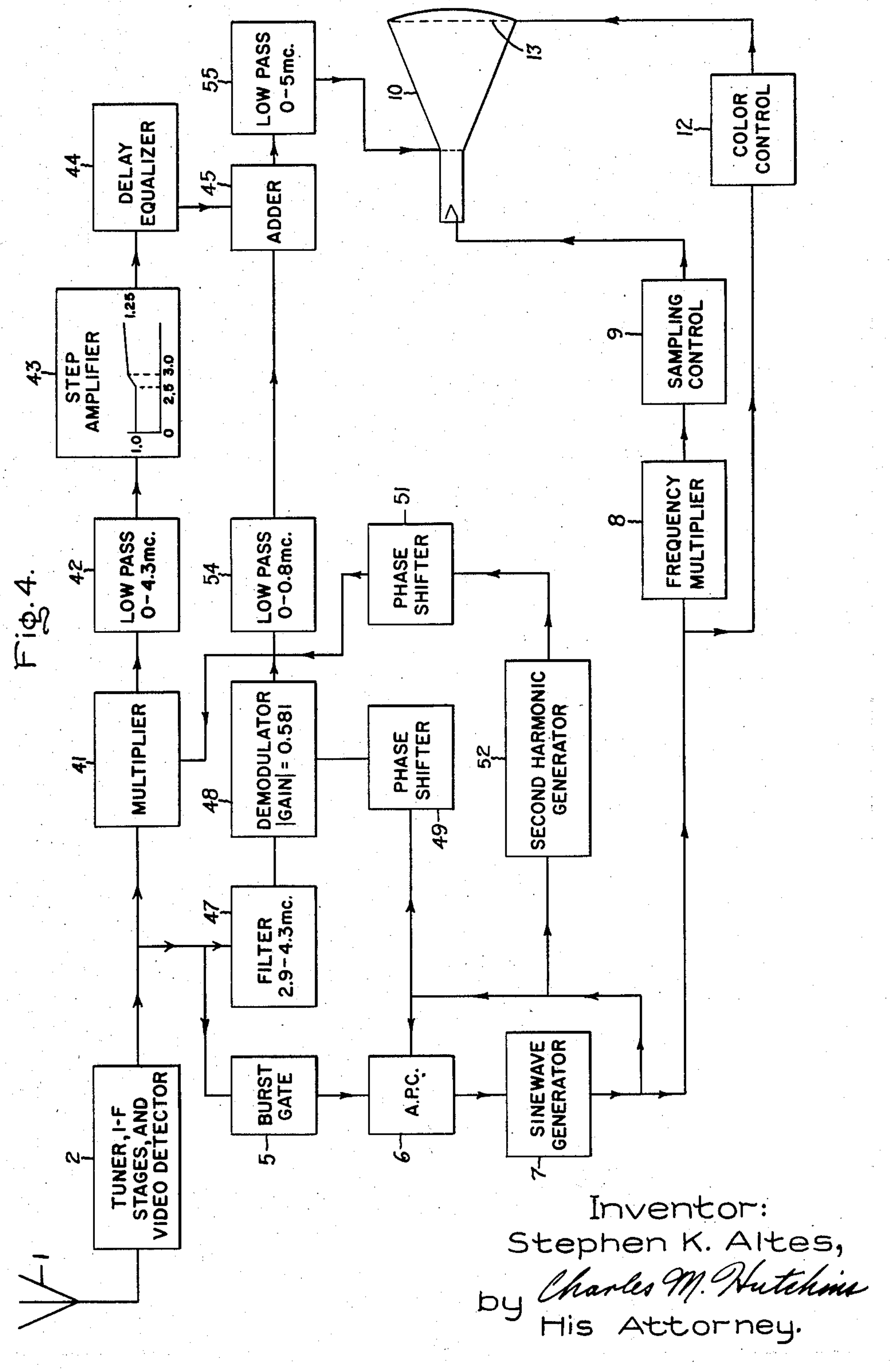
Fig. 4 is a schematic circuit diagram of a color television receiver embodying the signal-transformation circuits of my invention in an arrangement somewhat different from that of Fig. 1.

In Figure 4, the detected signal $E_m$ appears at the output of tuner, I.-F. stages, and video detector 2, just as in Figure 1. Moreover, the auxiliary circuit branch including burst gate 5, automatic phase-control circuit 6, sinewave generator 7, frequency multiplier 8, sampling control 9, cathode-ray tube 10, color control mechanism 12, and color control electrode 13 is a duplicate of the analogous circuitry in Figure 1. However, unlike multiplier 16 in Figure 1, multiplier 41 in Figure 4 operates on the entire signal $E_m$, instead of only a portion of $E_m$. Moreover, multiplier 41 has a gain of substantially $[1-.389\cos(2\omega t-5.6/57.3)]$. It will be noted that the gain of multiplier 41 lacks the factor 1.25 which is a part of the gain of multiplier 16. Despite this difference in magnitude between the respective gains of multipliers 16 and 41, the peaks of the second-harmonic waves applied in both multipliers should occur substantially 5.6 degrees (at second-harmonic frequency) behind the peaks of the $(E_R-E_y)$ subcarrier waves. It will be understood that the multiplying wave is derived from a phase shifter 51 and a second-harmonic generator 52 in the same way as in Figure 1.

The output of multiplier 41 goes to a low-pass filter 42 which may be conventional and should pass frequencies up to substantially 4.3 megacycles per second. The output of filter 42 goes in turn to a step amplifier 43, which should be such as to have a gain of substantially unity below a frequency of 2.5 megacycles per second and substantially 1.25 above a frequency of three megacycles per second, with a rather sharp transition between those frequencies. Step amplifier 43 may be of any known construction and might, for instance, consist of the parallel combination of a pair of band-pass filters, each in series with a suitable amplifier, in order to give the series-parallel combination the desired over-all step gain.

The output of step amplifier 43 goes to a delay equalizer 44 and, in turn, to an adder 45 where it is combined with the output of another circuit branch yet to be described. The delay equalizer should impose on the output of step amplifier 43 a time delay such that the two signals entering added 45 will have undergone equal time delays in transit from tuner, I.-F. stages, and video detector 2.

Turning to the details of the "other circuit branch" above referred to, the signal $E_m$ goes not only to burst-gate circuit 5 and multiplier 41, but also to a band-pass filter 47, which passes substantially only the frequencies between 2.9 and 4.3 megacycles per second. Filter 47, like filter 4 in Figure 1, may be made a high-pass filter passing frequencies above substantially 2.9 megacycles, rather than a band-pass filter passing frequencies from 2.9 to 4.3 megacycles. The output of filter 47, which may be conventional, goes to a demodulator 48, which may be of the type shown in Figure 3. The demodulator multiplies the output of filter 47 by a wave derived from a phase shifter 49, which in turn derives a wave of subcarrier frequency from sinewave generator 7 previously referred to. Like demodulator 15 in Figure 1, demodulator 48 should have a gain of substantially 0.581 and should multiply the output of filter 47 by a wave lagging the $(E_R-E_y)$ subcarrier wave by substantially 71.3 degrees. Stating the requirements differently, the output of filter 47 should be multiplied in demodulator 48 by a wave leading the $(E_B-E_y)$ subcarrier wave in the modulator by substantially 18.7 degrees.

The output of demodulator 48 goes to a low-pass filter 54, which may be conventional in design and should reject signals of frequencies substantially higher than 0.8 megacycle per second. As has been previously explained, the output of filter 54 is combined with the output of delay equalizer 44 in adder 45. As was explained in connection with the discussion of the embodiment of Figure 1, if adder 45 has peaking-circuit characteristics, the output thereof will be the desired symmetrical signal. If, on the other hand, adder 45 is such that its output contains any appreciable second harmonics, it will be desirable to employ a low-pass filter 55 to remove those second harmonics. Such a low-pass filter may be of any known construction and should pass no signals of frequencies substantially above five megacycles per second. The output of filter 55 is then the desired signal, which may be fed to the cathode-ray tube or utilized in any way.

Figure 5:
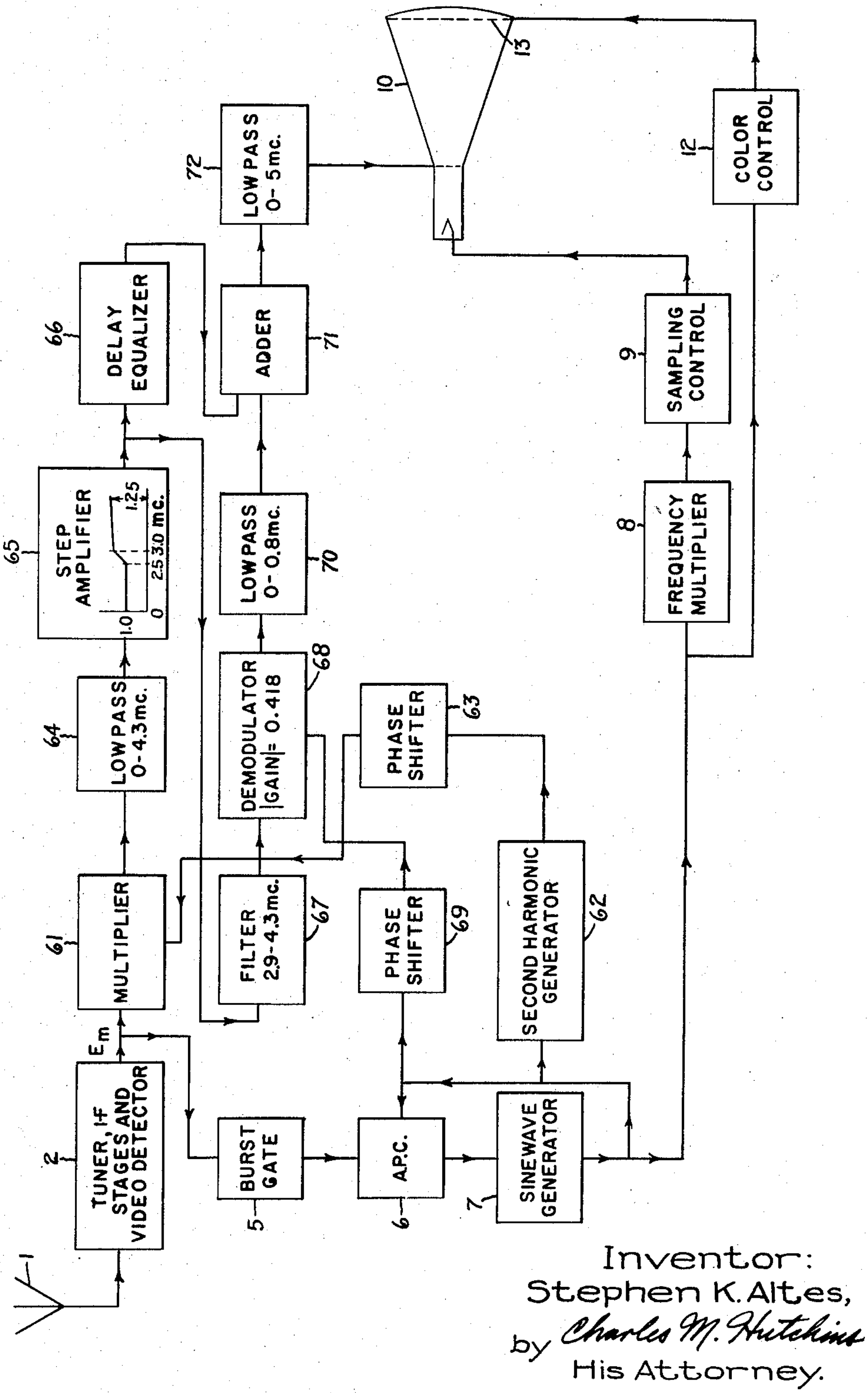
Fig. 5 is a schematic circuit diagram of a modified color television receiver in which some of the signal-transformation components have been arranged in series-circuit relationship.

Turning to Figure 5 of the drawing, there is shown a circuit embodiment in which the multiplier and the demodulator are in series, rather than in parallel circuits as in the embodiment of Figure 4. That is, while elements 5 through 13 are identical with, and arranged like, the corresponding elements in the embodiments of Figures 1 and 4, the other elements are somewhat rearranged in such a way that the output of the multiplier, after several modifications, passes through the demodulator.

As for the details of the circuitry of Figure 5, the multiplier 61 should be such as to multiply the signal $E_m$ by a quantity substantially equal to $$[1-.389 \cos (2\omega t-5.6/57.3)]$$

just as does multiplier 41 in Figure 4. The double-frequency wave is derived from the series combination of sinewave generator 7, a second-harmonic generator 62, and a phase shifter 63, in a manner substantially identical to the way the double-frequency wave is supplied to multiplier 41 in the embodiment of Figure 4. The output of multiplier 61 goes to a low-pass filter 64, which rejects substantially all signals of frequencies higher than 4.3 megacycles. The output of filter 64 goes to a step amplifier 65 like step amplifier 43 in the embodiment of Figure 4, wherein the gain is substantially unity below a frequency of 2.5 megacycles per second and substantially 1.25 above a frequency of three megacycles per second.

The output of amplifier 65 is directed in turn to a delay equalizer 66 and to a band-pass filter 67, the filter being such as to pass substantially the frequencies between 2.9 and 4.3 megacycles per second. Filter 67, like the other filters in the circuits of my invention, may be of standard construction. The output of filter 67 goes to a demodulator 68, which derives its demodulating wave from sinewave generator 7 through a phase shifter 69. The demodulator 68 should multiply its input by a wave lagging the original $(E_R-E_y)$ subcarrier therein by substantially 64.8 degrees, intead of the 71.3 degrees lag of demodulator 48 in the circuit of Figure 4, and the gain of demodulator 68 should have a magnitude of substantially 0.418, rather than the 0.581 value assigned to demodulator 48. Demodulator 68 may be similar in construction to demodulator 48, and both may be substantially as shown in Figure 3.

The output of demodulator 68 goes to a low-pass filter 70 which passes substantially only frequencies below 0.8 megacycle per second, and which may be of standard construction. The output of filter 70 is combined with the output of delay equalizer 66 in an adder 71, it being understood that the time delay imposed by delay equalizer 66 should be equal to the total delay imposed by filter 67, demodulator 68, and filter 70. The output of adder 71, if it contains any second or higher harmonics of the subcarrier frequency, should go to a low-pass filter 72, which should be such as to reject substantially all signals of frequencies higher than five megacycles per second. The output of filter 72 is then the desired signal, capable of undergoing symmetrical sampling.

Figure 6:
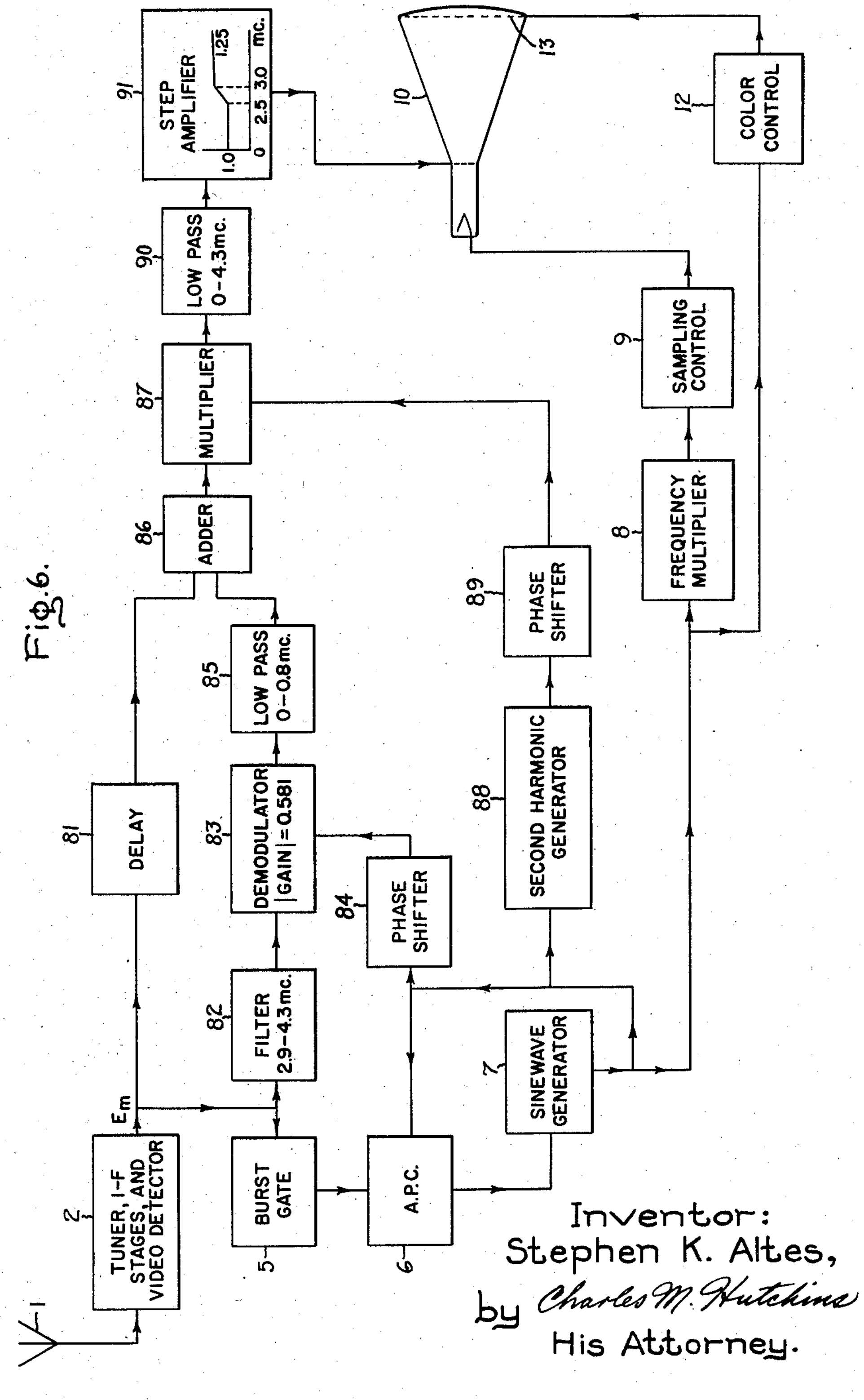
Fig. 6 is a schematic circuit diagram of still another modified color television receiver in which still more of the components are arranged in series-circuit relationship.

Figure 6 shows still another embodiment of my invention, in which the demodulator and the multiplier are again in series-circuit relationship, as in Figure 5. However, in the embodiment of Figure 6, the step amplifier is placed at the end of the signal-transformation sequence instead of midway in said sequence, and the order of the multiplier and the demodulator is interchanged. Once again, elements 5 through 13 in Figure 6 are like elements 5 through 13 in the embodiments of Figures 1, 4, and 6; moreover, the other elements in the embodiment of Figure 6 are like the corresponding elements in the embodiment of Figure 4, but are arranged somewhat differently. The signal $E_m$ goes to a delay line 81 and to a band-pass filter 82, which passes the chrominance components of $E_m$ but rejects the luminance components thereof. While it is suggested that filter 82 be made a band-pass filter passing frequencies between 2.9 and 4.3 megacycles, it would also be possible to use in its place a high-pass filter passing frequencies above 2.9 megacycles. The output of filter 82 goes to a demodulator 83 which is identical to demodulator 48 in the embodiment of Figure 4. That is, the gain of demodulator 83 should have a magnitude of 0.581, and the wave applied therein should be derived through a phase shifter 84 and should lag the $(E_R-E_y)$ subcarrier in demodulator 83 by substantially 71.3 degrees. Since the $(E_B-E_y)$ subcarrier lags the $(E_R-E_y)$ subcarrier by ninety degrees, the applied wave will necessarily lead the $(E_B-E_y)$ subcarrier in the demodulator by substantially 18.7 degrees. The output of demodulator 83 goes to a low-pass filter 85, and thence to an adder 86 wherein it is combined with the output of delay line 81. Low-pass filter 85 should be such as to pass substantially no frequencies above 0.8 megacycle per second, and may be of standard construction. It will be understood that the time delay imposed upon the signal $E_m$ by delay line 81 should be equal to the total time delay experienced by the signal in passing through filter 82, demodulator 83, and filter 85.

The output of adder 86 goes to a multiplier 87 which is identical to multiplier 41 in the embodiment of Figure 4. That is to say that multiplier 87 should have a gain of substantially $[1-.389 \cos (2\omega t-5.6/57.3)]$, where $\omega$ is the subcarrier frequency. It will be understood that the double-frequency multiplying wave is derived from sinewave generator 7 through a second-harmonic generator 88 and a phase shifter 89 and that the multiplier circuit may be that of Figure 2.

The output of multiplier 87 goes in turn to the series combination of a low-pass filter 90 and a step amplifier 91, which operate thereon to produce the desired symmetrical signal. It will be understood that the order of filter 90 and amplifier 91 in the circuit is unimportant, and that the functions of the two elements may be combined in one if desired. In any event, the overall effect of elements 90 and 91 should be such that signals of frequencies under 2.5 megacycles are passed substantially unaffected, signals of frequencies over approximately three megacycles but less than 4.3 megacycles undergo a gain of substantially 1.25, and signals of frequencies over approximately 4.3 megacycles are rejected.

It will be understood that, in the previous discussion, wherever gains of parallel circuit branches have been specified, the important consideration involved is the relative gains of the parallel branches with respect to each other. Hence, wherever the gain of a circuit branch is specified, multiplying or dividing that specified gain by any number will be proper, as long as the gains of branches in parallel with it are multiplied or divided by the same number.

Four different circuit arrangements capable of producing a signal suitable for symmetrical sampling have been shown and described. While the description has been directed to the transformation of a color television signal for symmetrical sampling, my invention is equally applicable to the transformation for symmetrical sampling of any signal expressible by an equation of the form of Equation 1. Moreover, while four different embodiments of the over-all circuitry of my invention have been shown and described, it will be understood that various modifications thereof may be made without departing from the principles of my invention. The appended claims are therefore intended to cover any such modifications within the true spirit and scope of my invention.

What I claim as new and desire to secure by Letters Patent of the United States is:

1. In combination, a source of periodic energy phase and frequency controlled from a signal line and nominally operating at a predetermined frequency, a first band-pass network characterized by low and high band end frequencies embracing said predetermined frequency excited from said signal line, a first signal-mixing device connected with the output from said first band-pass network and modifying signals derived therefrom with a first periodic time function under the control of said source, a signal-combining network having at least one output path and a plurality of input paths, a low-pass network characterized by an upper frequency limit below the low band end frequency of said first band-pass network connected between said first signal-mixing device and an input path to said signal-combining network, a second signal-mixing device connected with the output from said first band-pass network and modifying signals derived therefrom with a second periodic time function under the control of said source, the frequency of said second periodic time function being an integral multiple twice the frequency of said first periodic time function, and a second band-pass network having low and high band end frequencies substantially corresponding to the characteristic of said first band-pass network connected between said second signal-mixing device and said signal-combining network.

2. In combination, first and second electric signal-mixing devices each having a plurality of input paths and an output path, means for applying an electric signal to an input path of each of said mixing devices, means for applying a first periodic electric time function to another input path of said first signal-mixing device, means for applying a second periodic electric time function to another input path of said second signal-mixing device, the period of said second function being one half the period of said first function, a load circuit, a low-pass network connected between said first signal-mixing device and said load circuit, and a band-pass network substantially centered on the frequency of said first periodic function and excluding energy at the frequency of said second periodic function connected between said second signal-mixing device and said load circuit.

3. In combination, first and second electric signal-mixing devices each having a plurality of input paths and an output path, means for applying an electric signal to an input path of each of said mixing devices, means for applying a first periodic electric time function to another input path of said first signal-mixing device, means for applying a second periodic electric time function to another input path of said second signal-mixing device, the period of said second function being one half the period of said first function, a load circuit, a low-pass network connected between said first signal-mixing device and said load circuit, and a band-pass network connected between said second signal-mixing device and said load circuit.

4. In combination, first and second electric signal-mixing devices each having a plurality of input paths and an output path, means for applying an electric signal to an input path of each of said mixing devices, means for applying a first periodic electric time function to another input path of said first signal-mixing device, means for applying a second periodic electric time function to another input path of said second signal-mixing device, the period of said second function being one half the period of said first function, a load circuit, a first transmission network having a first frequency-transmission characteristic connected between one of said mixing devices and said load circuit, and a second transmission network having a different frequency-transmission characteristic connected between the other of said mixing devices and said load circuit.

5. In combination, a source of periodic energy phase and frequency controlled from a signal line and nominally operating at a predetermined frequency, a first band-pass network characterized by low and high band end frequencies embracing said predetermined frequency, excited from said signal line, a first signal-mixing device connected with the output from said first band-pass network and modifying signals derived therefrom with a first periodic time function under the control of said source, a signal-combining network having at least one output path and a plurality of input paths, a low-pass network characterized by an upper frequency limit below the low band end frequency of said first band-pass network connected between said first signal-mixing device and an input path to said signal-combining network, a second signal-mixing device connected with the output from said first band-pass network and modifying signals derived therefrom with a second periodic time function under the control of said source, the frequency of said second periodic time function being twice the frequency of said first periodic time function, and a second band-pass network having low and high band end frequencies substantially corresponding to the characteristic of said first band-pass network connected between said second signal-mixing device and said signal-combining network.

6. In combination, first and second electric signal-mixing devices, each having a plurality of input paths and an output path, means for applying an electric signal to an input path of each of said mixing devices, means for applying a first periodic electric function to another input path of said first signal-mixing device, means for applying a second periodic electric time function to another input path of said second signal-mixing device, the period of said second function being one half the period of said first function, and means jointly responsive to output energy from said first and second signal-mixing devices.

7. In combination, first and second electric signal-mixing devices each having a plurality of input paths and an output path, means for applying an electric signal to an input path of each of said mixing devices, means for applying a first periodic electric time function to another input path of said first signal-mixing device, means for applying a second periodic electric time function to another input path of said second signal-mixing device, the period of said second function being one half the period of said first function, and the spacing between the time-axis intercepts of said second function and of said first function lying within the range 60 degrees to 120 degrees measured on said second function, and means jointly responsive to output energy from said first and second signal-mixing devices.

8. A system for transforming into a strictly sequential signal a color television signal of the type defined as the sum of a luminance component, a red color-difference chrominance component impressed upon a first subcarrier wave, and a blue color-difference chrominance component impressed upon a second subcarrier wave of equal frequency but ninety degree phase displacement behind said first subcarrier wave, said system comprising a source of signals of the type described above, a multiplier branch, a demodulator branch, and filter means, means coupling at least said chrominance components from said source and a wave of twice subcarrier frequency to said multiplier branch, said wave of twice subcarrier frequency having the timing of its peak approximating a value optimally 5.6 degrees behind the peak of said red color-difference chrominance component, in said multiplier, said 5.6 degrees being measured at twice said subcarrier frequency, said multiplier branch comprising means for forming a product between said chrominance components and said wave of twice subcarrier frequency, means for coupling said chrominance components from said source and a wave of subcarrier frequency to said demodulator branch, said demodulator branch comprising means for forming a product between said chrominance components and said wave of subcarrier frequency, and means coupling the products of said multiplier branch and said demodulator branch to said filter means, said filter means having a filter characteristic removing substantially all components of frequencies higher than five megacycles per second.

9. A system for transforming into a strictly sequential signal a color television signal of the type defined as the sum of a luminance component, a red color-difference chrominance component impressed upon a first subcarrier wave, and a blue color-difference chrominance component impressed upon a second subcarrier wave of equal frequency but ninety degree phase displacement behind said first subcarrier wave, said system comprising a source of signals of the type described above, a multiplier branch, a demodulator branch, a bypass branch, and a filter, means coupling at least said chrominance components from said source and a wave of twice subcarrier frequency to said multiplier branch, said wave of twice subcarrier frequency having the timing of its peak approximating a value optimally 5.6 degrees behind the peak of said red color-difference chrominance component in said multiplier branch, said 5.6 degrees being measured at twice said subcarrier frequency, said multiplier branch comprising means for forming a product between said chrominance components and said wave of twice subcarrier frequency, means for coupling said chrominance components from said source and a wave of subcarrier frequency to said demodulator branch, said wave of subcarrier frequency having a phase lagging behind said red color-difference chrominance component by an amount approximating a value optimally 71.3 degrees, said demodulator branch comprising means for forming a product of the waves supplied thereto with a gain approximating a value optimally 0.581, means coupling said color television signal from said source to said bypass branch, said respective branches providing parallel paths leading to said filter, and said filter having a filter characteristic removing substantially all components of frequencies higher than 5 megacycles per second.

10. A system for transforming into a strictly sequential signal a color television signal of the type defined as the sum of a luminance component, a red color-difference chrominance component impressed upon a first subcarrier wave, and a blue color-difference chrominance component impressed upon a second subcarrier wave of equal frequency but ninety degree phase displacement behind said first subcarrier wave, said system comprising a source of signals of the type described above, a multiplier branch, a demodulator branch, and filter means, means supplying said luminance component and said chrominance components from said source and a wave of twice subcarrier frequency to said multiplier branch, said wave of twice subcarrier frequency having the timing of its peak approximating a value optimally 5.6 degrees behind the peak of said red color-difference chrominance component in said multiplier branch, said 5.6 degrees being measured at twice subcarrier frequency, said multiplier branch comprising means for forming a product between said luminance and chrominance components on the one hand and said wave of twice subcarrier frequency on the other hand, said multiplier branch having a non-uniform frequency response favoring higher frequency waves, means supplying said chrominance components and a wave of subcarrier frequency to said demodulator branch, said wave of subcarrier frequency lagging behind said red color-difference chrominance component in said demodulator branch by an amount approximating a value optimally 71.3 degrees, said demodulator branch comprising means for forming a product of the waves supplied thereto with a gain approximating a value optimally 0.581, said multiplier branch and said demodulator branch providing parallel circuit paths leading to said filter means, said filter means having a filter characteristic removing substantially all components of frequencies higher than 5 megacycles per second.

11. A system for transforming into a strictly sequential signal a color television signal of the type defined as the sum of a luminance component, a red color-difference chrominance component impressed upon a first subcarrier wave, and a blue color-difference chrominance component impressed upon a second subcarrier wave of equal frequency but ninety degree phase displacement behind said first subcarrier wave, said system comprising a source of signals of the type described above, a multiplier branch, a demodulator branch, and a filter, means supplying said luminance component and said chrominance components from said source and a wave of twice subcarrier frequency to said multiplier branch, said wave of twice subcarrier frequency having the timing of its peak approximating a value optimally 5.6 degrees behind the peak of said red color-difference chrominance component in said multiplier branch, said 5.6 degrees being measured at twice subcarrier frequency, said multiplier branch comprising means for forming a product between said luminance and chrominance components on the one hand and said wave of twice subcarrier frequency on the other hand, said multiplier branch having a non-uniform frequency response favoring higher frequency waves, means supplying chrominance components from the output of said multiplier branch and a wave of subcarrier frequency to said demodulator branch, said wave of subcarrier frequency lagging behind said red color-difference chrominance component in said demodulator branch by an amount approximating a value optimally 64.8 degrees, said demodulator branch comprising means for forming a product of the wave supplied thereto with a gain approximating a value optimally 0.418, and a bypass branch also coupled to the output of said multiplier branch and providing with said demodulator branch parallel circuit paths leading to said filter, said filter having a filter characteristic removing substantially all components of frequencies higher than 5 megacycles per second.

12. A system for transforming into a strictly sequential signal a color television signal of the type defined as the sum of a luminance component, a red color-difference chrominance component impressed upon a first subcarrier wave, and a blue color-difference chrominance component impressed upon a second subcarrier wave of equal frequency but ninety degree phase displacement behind said first subcarrier wave, said system comprising a source of signals of the type described above, a demodulator branch, a by-pass around said demodulator branch, a multiplier branch, and a filter, means supplying said chrominance components from said source and a wave of subcarrier frequency to said demodulator branch, said wave of subcarrier frequency lagging behind said red color-difference chrominance component in said demodulator branch by an amount approximating a value optimally 71.3 degrees, said demodulator branch comprising means for forming a product of the waves supplied thereto with a gain approximating a value optimally 0.581, means coupling said luminance component and said chrominance components from said source through said bypass, the output of said demodulator, and a wave of twice subcarrier frequency to said multiplier branch, said wave of twice subcarrier frequency having the timing of its peak approximating a value optimally 5.6 degrees behind the peak of said red color-difference chrominance component in said multiplier branch, said 5.6 degrees being measured at twice subcarrier frequency, said multiplier branch comprising means for forming a product between said luminance component, said chrominance components, and the output of said demodulator branch on the one hand and said wave of twice subcarrier frequency on the other hand, said multiplier branch having a non-uniform frequency response favoring higher frequency waves, said filter being connected in series with said multiplier branch and having a filter characteristic removing substantially all components of frequencies higher than 5 megacycles per second.

References Cited in the file of this patent

UNITED STATES PATENTS 2,734,940 Loughlin ............ Feb. 14, 1956

OTHER REFERENCES

Principles of NTSC Compatible Color Television Electronics, February 1952, pages 88–97, incl.